(12) United States Patent
Ahn et al.

(10) Patent No.: US 10,461,890 B2
(45) Date of Patent: Oct. 29, 2019

(54) APPARATUS AND METHOD FOR PROCESSING SIGNAL IN WIRELESS COMMUNICATION SYSTEM

(71) Applicants: Samsung Electronics Co., Ltd, Suwon-si (KR); Postech Academy-Industry Foundation, Pohang-si (KR)

(72) Inventors: Seok-Ki Ahn, Suwon-si (KR); Kyeongcheol Yang, Pohang-si (KR); Daeyeol Yang, Pohang-si (KR); Sunghye Cho, Pohang-si (KR)

(73) Assignees: Samsung Electronics Co., Ltd., Suwon-si (KR); Postech Academy-Industry Foundation, Pohang-si (KR)

( * ) Notice: Subject to any disclaimer, the term of this patent is extended or adjusted under 35 U.S.C. 154(b) by 0 days.

(21) Appl. No.: 15/891,265

(22) Filed: Feb. 7, 2018

(65) Prior Publication Data
US 2018/0227079 A1 Aug. 9, 2018

(30) Foreign Application Priority Data

Feb. 8, 2017 (KR) .................. 10-2017-0017584

(51) Int. Cl.
*H04B 17/00* (2015.01)
*H04L 1/00* (2006.01)
(Continued)

(52) U.S. Cl.
CPC ...... *H04L 1/0054* (2013.01); *H04L 25/03057* (2013.01); *H04L 25/03891* (2013.01);
(Continued)

(58) Field of Classification Search
CPC . H04L 27/01; H04L 25/03038; H04L 1/0054; H04L 5/0055; H04L 63/10;
(Continued)

(56) References Cited

U.S. PATENT DOCUMENTS

2012/0300828 A1* 11/2012 Erez .................. H04L 1/0059
375/230
2017/0238317 A1* 8/2017 Choi ................ H04W 72/0453
375/341

(Continued)

FOREIGN PATENT DOCUMENTS

KR 10-2017-0121444 A 11/2017

OTHER PUBLICATIONS

Jiening Zhan et al., "Integer-Forcing Linear Receivers", IEEE Transactions on Information Theory, vol. 60, Issue 12, Dec. 2014, date of publication Oct. 8, 2014, 26 pages.

*Primary Examiner* — Khai Tran

(57) ABSTRACT

The present disclosure relates to a pre-5$^{th}$-Generation (5G) or 5G communication system for supporting higher data rates Beyond 4$^{th}$-Generation (4G) communication systems such as Long Term Evolution (LTE). A method for operating a receiver in a wireless communication system may include: receiving a signal from a transmitter; performing Integer Forcing (IF) equalization on the received signal; determining a log LikeLihood Ratio (LLR) value of each bit by using a posteriori probability of each bit for the signal determined based on an equalization matrix and a likelihood value for the signal; and decoding the signal by using the LLR value.

18 Claims, 17 Drawing Sheets

(51) Int. Cl.
*H04L 27/38* (2006.01)
*H04L 25/03* (2006.01)
*H04L 25/06* (2006.01)
*H04L 27/01* (2006.01)
*H04L 27/36* (2006.01)

(52) U.S. Cl.
CPC ............ *H04L 25/067* (2013.01); *H04L 27/01* (2013.01); *H04L 27/36* (2013.01); *H04L 27/38* (2013.01); *H04L 1/0045* (2013.01); *H04L 2025/0342* (2013.01); *H04L 2201/06* (2013.01)

(58) Field of Classification Search
CPC ....... H04L 27/38; H04B 1/707; H04B 7/0456; H04W 12/08; H04W 52/146; H04W 52/0206
USPC .................... 375/235, 341, 230; 370/31, 332
See application file for complete search history.

(56) References Cited

U.S. PATENT DOCUMENTS

| | | | |
|---|---|---|---|
| 2017/0244515 A1* | 8/2017 | Razzetti | H03M 13/1111 |
| 2017/0311331 A1 | 10/2017 | Chae et al. | |
| 2018/0102873 A1* | 4/2018 | Song | H04L 1/0041 |
| 2018/0167636 A1* | 6/2018 | Mun | H04L 29/00 |

* cited by examiner

APPARATUS AND METHOD FOR PROCESSING SIGNAL IN WIRELESS COMMUNICATION SYSTEM

CROSS-REFERENCE TO RELATED APPLICATION(S)

This application is related to and claims the benefit of Korean Patent Application No. 10-2017-0017584 filed on Feb. 8, 2017, the contents of which are incorporated herein by reference.

TECHNICAL FIELD

The present disclosure relates to a wireless communication system and, more specifically, to an apparatus and a method for processing signals.

BACKGROUND

The above information is presented as background information only to assist with an understanding of the present disclosure. No determination has been made, and no assertion is made, as to whether any of the above might be applicable as prior art with regard to the present disclosure.

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

An integer forcing (IF) receiver has attracted attention as a linear receiver that attains maximum diversity in a multi-antenna system. In order for a receiver to decode a combination of codewords by using the linearity of linear codes, a modulation scheme is required, in which the order is a prime number in each antenna of a transmitter. However, since a 2$^M$-QAM-based modulation scheme is used in various mobile communication and broadcasting communication standards, a receiver using a modulation scheme with an order of a prime number is difficult to be directly applied to an actual system.

In order to solve the above problem, a scheme using a multiple level coding (MLC)-based 2$^M$-QAM symbol may be considered. However, since the scheme using an MLC-based 2$^M$-QAM symbol requires implementation of an encoder and a decoder for each bit-level constituting a 2$^M$-QAM symbol, the length of codes constituting each level decreases as the modulation order increases.

SUMMARY

Based on the foregoing discussion, the present disclosure provides an apparatus and a method for processing signals in a wireless communication system.

In addition, the present disclosure provides an apparatus and a method for using a single level coding (SLC)-based integer forcing (IF) scheme in a wireless communication system.

In addition, the present disclosure provides an apparatus and a method for determining one codeword corresponding to input bits in a wireless communication system.

In addition, the present disclosure provides an apparatus and a method for applying natural labeling to coded bits in a wireless communication system.

In addition, the present disclosure provides an apparatus and a method for determining a posteriori probability (APP) for the m$^{th}$ bit of a combination of binary-modulated symbols by using APP for the 1$^{st}$ to (m−1)$^{th}$ bits of a combination of binary-modulated symbols in a wireless communication system.

Furthermore, the present disclosure provides an apparatus and a method for determining a log likelihood ratio (LLR) for the m$^{th}$ bit of a combination of binary-modulated symbols by using APP for the m$^{th}$ bit of a combination of binary-modulated symbols in a wireless communication system.

In accordance with various embodiments of the present disclosure, a method for operating a receiver in a wireless communication system may include: receiving a signal from a transmitter; performing integer forcing (IF) equalization on the received signal; determining a log likelihood ratio (LLR) value of each bit by using a posteriori probability of each bit for the signal determined based on an equalization matrix and a likelihood value for the signal; and decoding the signal by using the LLR value.

In accordance with various embodiments of the present disclosure, a method of operating a transmitter in a wireless communication system may include: determining a codeword corresponding to bits input into the transmitter; performing binary modulation on each bit of the codeword; combining binary-modulated symbols generated based on the binary-modulated bits; and transmitting the combined binary-modulated symbols to a receiver.

In accordance with various embodiments of the present disclosure, a receiver apparatus in a wireless communication system may include: a transmitting and receiving unit configured to receive a signal from a transmitter; and a controller configured to perform integer forcing (IF) equalization on the received signal, to determine a log likelihood ratio (LLR) value of each bit by using a posteriori probability of each bit for the signal determined based on an equalization matrix and a likelihood value for the signal, and to decode the signal by using the LLR value.

In accordance with various embodiments of the present disclosure, a transmitter apparatus in a wireless communication system may include: a controller configured to determine a codeword corresponding to bits input into the transmitter, to perform binary modulation on the respective bits of the codeword, and to combine binary-modulated symbols generated based on the binary-modulated bits; and a transmitting and receiving unit configured to transmit the combined binary-modulated symbols to a receiver.

An apparatus and a method, according to various embodiments of the present disclosure, can perform single level coding (SLC)-based integer forcing (IF) detection.

In addition, an apparatus and a method, according to various embodiments of the present disclosure, can implement a transceiver using two encoders and decoders for each antenna.

In addition, an apparatus and a method, according to various embodiments of the present disclosure, can reduce decoding delay.

Furthermore, an apparatus and a method, according to various embodiments of the present disclosure, can reduce effective noise.

The effects, which can be obtained in the present disclosure, are not limited to the effects mentioned above, and other effects, which have not been mentioned above, can be clearly understood by those skilled in the art from the description below.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document. Those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 12, discussed below, and the various embodiments used to describe the principles of the present disclosure are by way of illustration only and should not be construed in any way to limit the scope of the disclosure. Those skilled in the art will understand that the principles of the present disclosure may be implemented in any suitably arranged system or device.

The terms used in the present disclosure are used to describe specific embodiments, and are not intended to limit the present disclosure. A singular expression may include a plural expression unless they are definitely different in a context. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

Hereinafter, various embodiments of the present disclosure will be described based on an approach of hardware. However, various embodiments of the present disclosure include a technology that uses both hardware and software and thus, the various embodiments of the present disclosure may not exclude the perspective of software.

The present disclosure relates to an apparatus and a method for processing signals in a wireless communication system.

Terms referring to a coding scheme {e.g., Single Level Coding (SLC)}, a metric for a received signal {e.g., A Posteriori Probability (APP)}, terms referring to a log Like-Lihood Ratio (LLR), terms referring to control information, terms referring to messages, and terms referring to elements of the apparatus, which are used in the present disclosure, are examples for the convenience of explanation. Therefore, the present disclosure is not limited to the terms described below, and other terms having equivalent technical meanings can be used.

Figure 1:
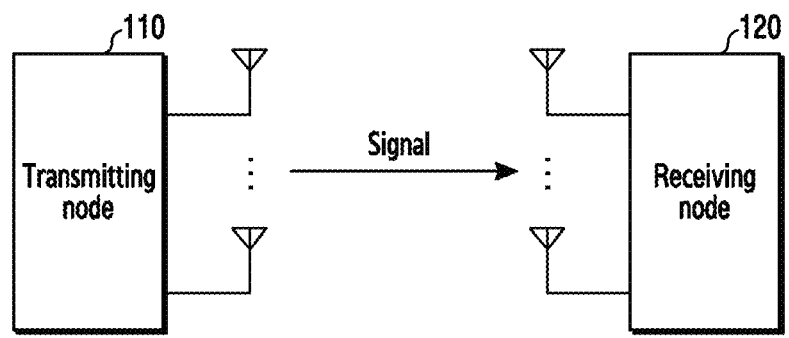
FIG. 1 illustrates an example of a wireless communication system according to various embodiments of the present disclosure.

FIG. 1 illustrates an example of a wireless communication system according to various embodiments of the present disclosure. Referring to FIG. 1, the wireless communication system includes a transmitter 110 and a receiver 120.

Referring to FIG. 1, the transmitter 110 may transmit control information and data to the receiver 120. In addition, the receiver 120 may transmit control information to the transmitter 110, and may receive data therefrom. The control information may include at least one piece of channel-related information, receiver-related capability information, transmitter-related capability information, transmission scheme-related information to be applied to data, desired transmission scheme-related information, or resource allocation-related information.

The transmitter 110 supports a plurality of transmission schemes. The transmission schemes refer to signal processing techniques to be applied during the conversion of transmission data to radio signals, and may relate to procedures such as channel coding and modulation, analog conversion, frequency conversion, or the like. That is, the transmission scheme refers to a single signal processing rule or a combination of signal processing rules for processing the transmission data. More specifically, the transmission schemes may be defined as at least one of a rule for a combination of channel coding and modulation, a rule for bit-to-symbol mapping, a rule for symbol-to-antenna mapping, a rule for resource mapping, a rule for resource allocation, or a rule for reference signal (RS) allocation, or as a combination thereof. Based on control information received from the receiver 120 or information measured by the transmitter 110, the transmitter 110 may select one of a plurality of transmission schemes, and may apply the same to the transmission data.

The receiver 120 supports a plurality of reception algorithms. For example, the receiver 120 may support at least one of maximum likelihood (ML), zero forcing (ZF), minimum mean square error (MMSE), MMSE-successive interference cancellation (SIC), integer-forcing (IF), decoding, or IF detection. IF decoding and the IF detection are algorithms based on integerization of an effective channel matrix. Based on control information received from the transmitter 110 or information measured by the transmitter 110, the receiver 120 may select one of a plurality of reception algorithms, and may use the same for processing the received data.

The transmitter 110 and the receiver 120 are distinguished according to the transmission direction of data. Accordingly, in various embodiments one device may operate as the transmitter 110 or the receiver 120. For example, in the case of downlink communication, the transmitter 110 may be a base station and the receiver 120 may be a terminal. As another example, in the case of uplink communication, the transmitter 110 may be a terminal and the receiver 120 may be a base station. In addition, in the case of device-to-device (D2D) communication, the transmitter 110 may be a terminal and the receiver 120 may be another terminal. Here, the D2D communication may be referred to as side-link communication. In addition, the transmitter 110 may be a base station, and the receiver 120 may be another base station. In addition to the examples described above, the transmitter 110 and the receiver 120 may be various other devices.

According to an embodiment, the transmitter 110 may include $N_T$ transmitting antennas and the receiver 120 may include $N_R$ receiving antennas. Further, the wireless communication system according to an embodiment may be an integer forcing-multiple input multiple output (IF-MIMO) system based on quadrature amplitude modulation ($2^M$-QAM). In this case, the received-signal model is expressed as Equation 1 below.

$$y_c = H_c s_c + n_c \quad \text{[Equation 1]}$$

In Equation 1, $y_c$ denotes a received-signal vector, $H_c$ denotes a channel matrix, $s_c$ denotes a transmission signal vector, and $n_c$ denotes a white Gaussian noise vector. In some embodiments, the receiver 120 may know a channel matrix. The IF-MIMO received-signal model in Equation 1 having a complex value may be expressed by the same received-signal model having a real value as shown in Equation 2 below.

$$\begin{bmatrix} \text{Re}(y_c) \\ \text{Im}(y_c) \end{bmatrix} = \begin{bmatrix} \text{Re}(H_c) & -\text{Im}(H_c) \\ \text{Im}(H_c) & \text{Re}(H_c) \end{bmatrix} \begin{bmatrix} \text{Re}(s_c) \\ \text{Im}(s_c) \end{bmatrix} + \begin{bmatrix} \text{Re}(n_c) \\ \text{Im}(n_c) \end{bmatrix} \quad \text{[Equation 2]}$$

In Equation 2, $\text{Re}(y_c)$ denotes a real number component of a received-signal vector, $\text{Im}(y_c)$ denotes an imaginary number component of a received-signal vector, $\text{Re}(H_c)$ denotes a real number component of a channel matrix, $\text{Im}(H_c)$ denotes an imaginary number component of a channel matrix, $\text{Re}(s_c)$ denotes a real number component of a transmission signal vector, $\text{Im}(s_c)$ denotes an imaginary number component of a transmission signal vector, $\text{Re}(n_c)$ denotes a real number component of a white Gaussian noise vector, and $\text{Im}(n_c)$ denotes an imaginary number component of a white Gaussian noise vector. In this case, in the received-signal model having a real value, the number of transmitting antennas of the transmitter 110 may be $2N_T$, the number of receiving antennas of the receiver 120 may be $2N_R$, and the modulation scheme may be $2^{M/2}$-PAM (pulse amplitude modulation). Although the wireless communication system is regarded as a $2^{M/2}$-PAM-based IF-MIMO system in the received-signal model having a real value in the following description, the various embodiments are not limited to a specific modulation or transmission scheme.

Figure 2:
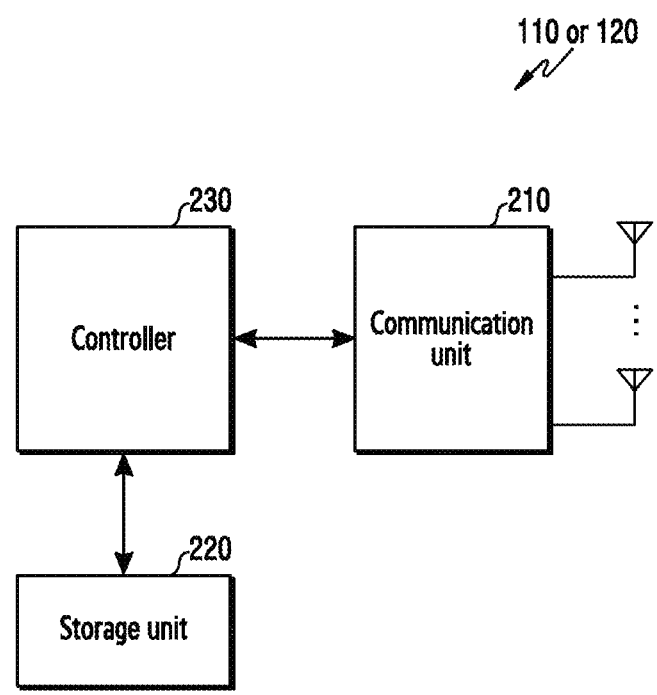
FIG. 2 illustrates an example of a functional configuration of a transmitter or a receiver in a wireless communication system according to various embodiments of the present disclosure.

FIG. 2 illustrates an example of a functional configuration of a transmitter or a receiver in a wireless communication system according to various embodiments of the present disclosure. The terms '-unit', '-er(or)', or the like, which will be used below, denote a unit for processing at least one function or operation, and may be implemented by hardware, software, or a combination thereof.

Referring to FIG. 2, the transmitter 110 or the receiver 120 includes a communication unit 210, a storage unit 220, and a controller 230.

The communication unit 210 performs functions of transmitting and receiving signals through a radio channel. For example, the communication unit 210 performs a function for conversion between a baseband signal and a bit sequence according to a physical layer standard of a system. For example, when transmitting data, the communication unit 210 generates modulation symbols by encoding and modulating a transmission bit stream. In addition, when receiving data, the communication unit 210 recovers a received bit stream by demodulating and decoding a baseband signal. The communication unit 210 up-converts a baseband signal to an RF (radio frequency) band signal to thus transmit the same through an antenna, and down-converts an RF band signal received through the antenna to a baseband signal. For example, the communication unit 210 may include an encoder, a decoder, a modulator, a demodulator, a digital-to-analog converter (DAC), an analog-to-digital converter (ADC), a transmitting filter, a receiving filter, an amplifier, a mixer, an oscillator, and the like.

In addition, the communication unit 210 may include a plurality of RF chains. Furthermore, the communication unit 210 may perform beam-forming. In these embodiments, the communication unit 210 may adjust the phases and sizes of the respective signals transmitted and received through a plurality of antennas or antenna elements (that is, may perform analog beam-forming). Alternatively, the communication unit 210 may perform beam-forming for digital signals (i.e., digital beam-forming).

In addition, the communication unit 210 may include different communication modules for processing signals of different frequency bands. Furthermore, the communication unit 210 may include a plurality of communication modules in order to support a plurality of different radio access techniques. For example, different radio access techniques may include Bluetooth low energy (BLE), Wireless Fidelity (Wi-Fi), Wi-Fi Gigabyte (WiGig), cellular networks {e.g., LTE, LTE-A, or the 5G ($5^{th}$ generation) network}, and the like. In addition, different frequency bands may include a super high frequency (SHF) (e.g., 2.5 GHz or 5 GHz) band and a millimeter (mm) wave (e.g., 30 GHz or 60 GHz) band.

The communication unit 210 transmits and receives signals as described above. Accordingly, the communication unit 210 may be referred to as a transmitter, a receiver, or a transceiver. In the following description, the transmission and reception performed through a radio channel will be used so as to include an operation in which the communication unit 210 performs the process as described above.

The storage unit 220 stores data, such as basic programs, application programs, and setting information, for the operation of the transmitter 110 or the receiver 120. The storage unit 220 may be configured as a volatile memory, a non-volatile memory, or a combination thereof. The storage unit 220 provides the stored data at a request of the controller 230.

The controller 230 controls overall operations of the transmitter 110 or the receiver 120. For example, the controller 230 transmits and receives signals through the communication unit 210. The controller 230 also records and reads data in and from the storage unit 220. To this end, the controller 230 may include one or more processors or microprocessors, or may be a part thereof. In addition, a part of the communication unit 210 and the controller 230 may be referred to as a communication processor (CP). In particular, the controller 230 performs control such that the transmitter 110 or the receiver 120 exchanges control information and selects a transmission scheme or a reception algorithm according to various embodiments described below. For example, the controller 230 may perform control such that the transmitter 110 or the receiver 120 performs a procedure according to various embodiments described below.

FIG. 2 illustrates an example of a configuration of the transmitter 110 or the receiver 120. If the configuration of FIG. 2 corresponds to a base station, the configuration may further include a backhaul communication unit for providing an interface for communication with a backhaul network.

Figure 3:
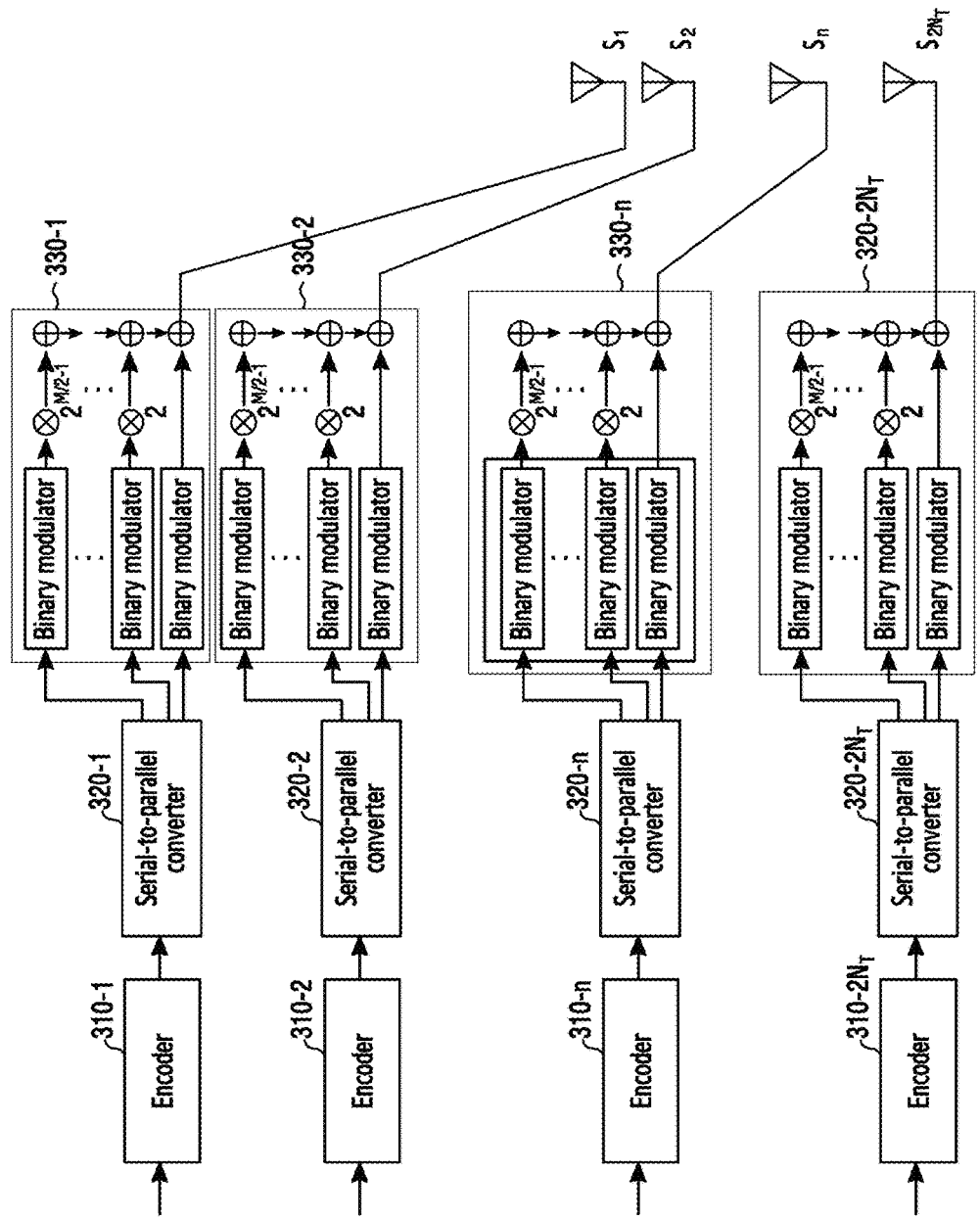
FIG. 3 illustrates an example of a structure of a transmitter for transmitting, based on single level coding (SLC), signals in a wireless communication system according to various embodiments of the present disclosure.

FIG. 3 illustrates an example of a structure of a transmitter for transmitting, based on single level coding (SLC), signals in a wireless communication system according to various embodiments of the present disclosure. The terms '-unit', '-er(or)', or the like, which will be used below, denote a unit for processing at least one function or operation, and may be implemented by hardware, software, or a combination thereof. The configuration illustrated in FIG. 3 may be regarded as a configuration of the communication unit 210 of the transmitter 110.

Referring to FIG. 3, the communication unit 210 of the transmitter 110 includes encoders 310-1 to 310-$2N_T$, serial-to-parallel converters 320-1 to 320-$2N_T$, and modulators 330-1 to 330-$2N_T$. As an example of a $2^{M/2}$-PAM-based received-signal model having a real value, the transmitter 110 may include $2N_T$ transmitting antennas. The encoders 310-1 to 310-$2N_T$, the serial-to-parallel converters 320-1 to 320-$2N_T$, and the modulators 330-1 to 330-$2N_T$ configure a plurality of antenna paths, and the operations of the respective antenna paths are substantially the same. Therefore, for the sake of convenience of description, the operations of the encoder 310-$n$, the serial-to-parallel converter 320-$n$, and the modulator 330-*n* constituting the n$^{th}$ antenna path will be described on behalf of the antenna paths.

The encoder 310-*n* generates a codeword for the information word generated in the transmitter 110. That is, the encoder 310-*n* performs channel encoding in the transmitter 110.

The serial-to-parallel converter 320-*n* separates the generated codeword into M/2 bit streams. In other words, the serial-to-parallel converter 320-*n* parallelizes the generated codeword into M/2 bit streams and transmits the parallelized bit streams to the modulator 330-*n*.

Figure 4:
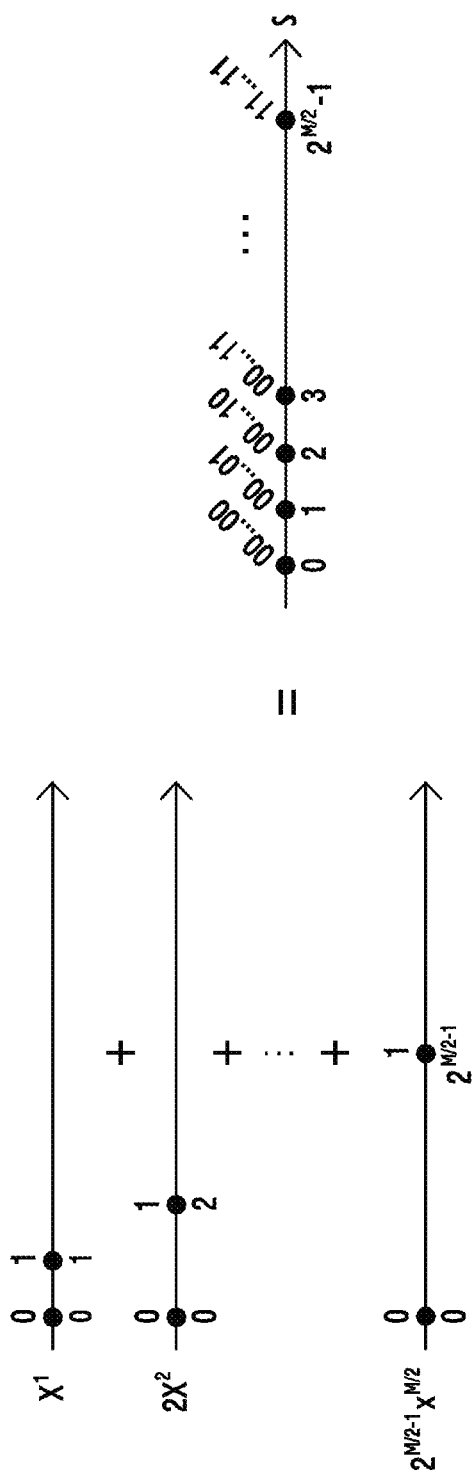
FIG. 4 illustrates an example of a symbol configuration in a wireless communication system according to various embodiments of the present disclosure.

The modulator 330-*n* generates a $2^{M/2}$-PAM symbol from the M/2 bit streams received from the serial-to-parallel converter 320-*n*. To this end, the modulator 330-*n* may include one or more binary modulators, one or more multipliers, and one or more adders. The one or more binary modulators generate a symbol having a size corresponding to 0 or 1 by binary-modulating the input bit. For example, the modulator 330-*n* may include 2M/2 binary modulators. In this case, as shown in FIG. 4, the modulator 330-*n* may generate M/2 binary-modulated symbols $x^{(m)}$ (m=1, 2, . . . , and M/2).

The modulator 330-*n* generates a $2^{M/2}$-PAM symbol from the binary-modulated symbols generated from the M/2 bit streams. The modulator 330-*n* may be referred to as a '$2^{M/2}$-PAM modulator'. More specifically, one or more multipliers of the modulator 330-*n* scale the M/2 binary-modulated symbols to different sizes of the power of two, respectively. For example, referring to FIG. 4, the binary-modulated symbol $x^1$ may be scaled to $2^0$, the binary-modulated symbol $x^2$ may be scaled to $2^1$, and the binary-modulated symbol $x^{M/2}$ may be scaled to $2^{M/2-1}$. In addition, one or more adders of the modulator 330-*n* generates a $2^{M/2}$-PAM symbol by summing all of the scaled binary-modulated symbols. For example, referring to FIG. 4, the $2^{M/2}$-PAM symbol 's' may be configured with the sum of M/2 binary-modulated symbols $x^{(m)}$. In this case, the bit mapping between the bits input into the modulator 330-*n* and the $2^{M/2}$-PAM symbol 's' may be made by natural labeling. The natural labeling is a method of coded modulation (CM), in which mapping is performed such that the digits represented by the bits increase by 1 according to the order of constellation points. The natural labeling may be referred to as 'natural mapping' or other names having equivalent technical meaning depending on its technical meaning.

In some embodiments, $2N_T 2^{M/2}$-PAM symbols transmitted through the $2N_T$ transmitting antennas of the transmitter 110 may be expressed as a vector 's' as shown in Equation 3 below.

$$s = \sum_{m=1}^{M/2} 2^{m-1} x^{(m)} \quad \text{[Equation 3]}$$

In Equation 3, 's' denotes a transmission signal vector including $2N_T 2^{M/2}$-PAM symbols, and $x^{(m)}$ denotes a vector including binary-modulated symbols generated by the m$^{th}$ bit allocated to the $2^{M/2}$-PAM symbol.

In FIG. 3, due to the structure of the transmitter 110 in which one encoder 310-*n* is connected to one modulator 330-*n*, the transmitter 110 may perform encoding and $2^{M/2}$-PAM modulation independently for the real number component and the imaginary number component, respectively.

Figure 5A:
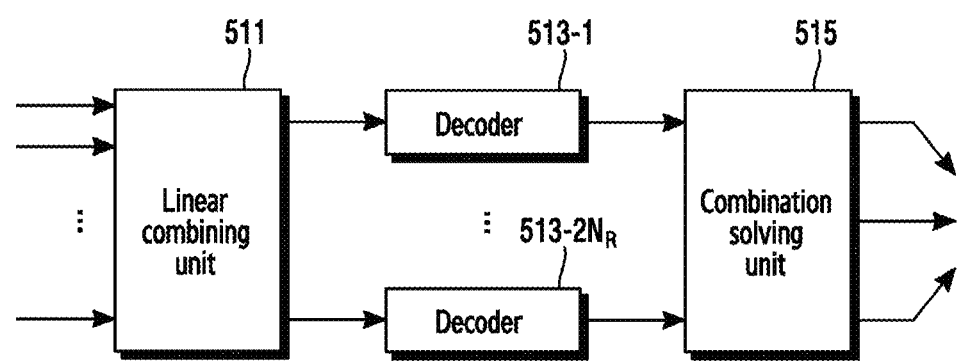
FIGS. 5A to 5C illustrate examples of a structure of a receiver for processing a received signal in a wireless communication system according to various embodiments of the present disclosure.
Figure 5B:
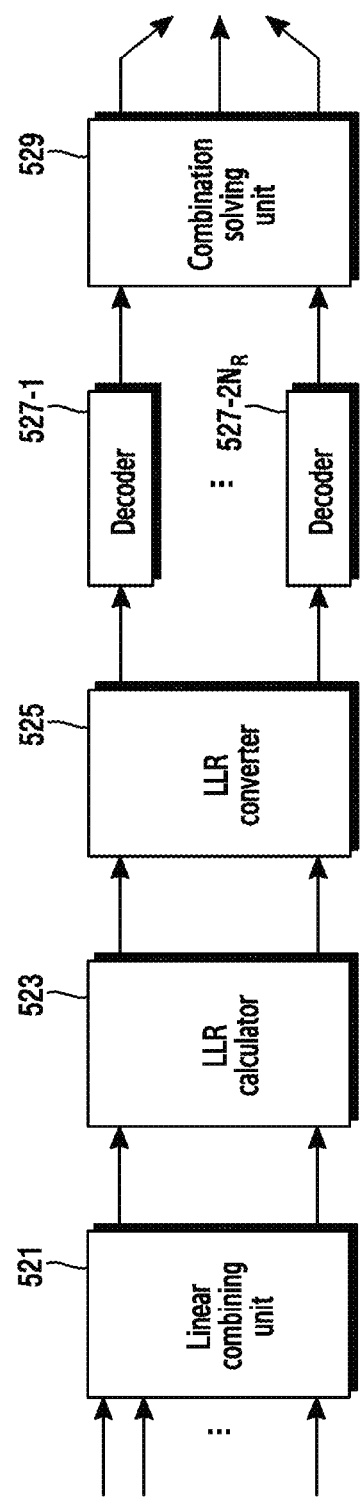
Figure 5C:
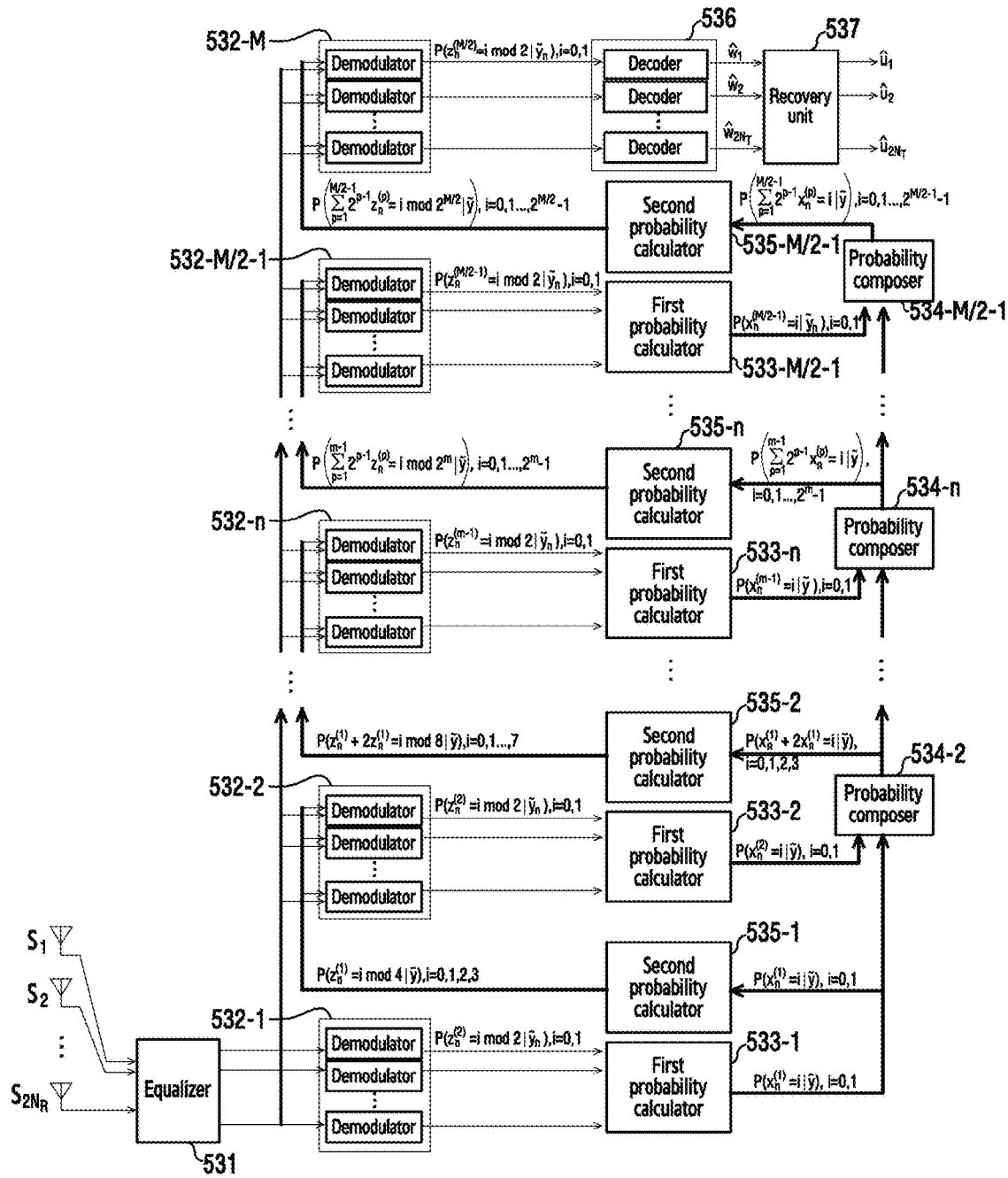

FIGS. 5A to 5C illustrate examples of a structure of a receiver for processing a received signal in a wireless communication system according to various embodiments of the present disclosure. The terms '-unit', '-er(or)', or the like, which will be used below, denote a unit for processing at least one function or operation, and may be implemented by hardware, software, or a combination thereof. The configuration illustrated in FIGS. 5A to 5C may be regarded as a configuration of the communication unit 210 of the receiver 120.

FIG. 5A illustrates the structure of the receiver 120 that supports IF decoding. Referring to FIG. 5A, the receiver 120 includes a linear combining unit 511, decoders 513-1 to 513-$2N_R$, and a combination solving unit 515. The linear combining unit 511 and the combination solving unit 515 may be referred to as a 'linear equalizer' and a 'linear equation solving unit', respectively.

The linear combining unit 511 multiplies a received signal for each antenna, which is received via the radio channel, by an equalization matrix. The equalization matrix is used to convert an effective channel matrix to an integer matrix. In addition, the equalization matrix may be used to reduce the effective noise and to convert the effective channel matrix to a full rank matrix. Thus, the product of the equalization matrix and the channel matrix may be referred to as an 'integerized effective channel matrix' or an 'integer-valued matrix'. To this end, the linear combining unit 511, based on the channel matrix, the channel quality, or the like, determines the equalization matrix or receives an equalization matrix from other blocks in the receiver 120. The operation of the linear combining unit 511 outputs signals representing linearly summed codewords and signals in which effective noises are summed. Unlike channel inversion executed in a linear reception algorithm, such as ZF and MMSE, the operation of the linear combining unit 511 generates combined codewords. In other words, other codewords, which are generated by combining the codewords transmitted from the transmitter 110, are output. At this time, other codewords may constitute valid codewords as well.

The decoders 513-1 to 513-$2N_R$ decode the combined codewords output from the linear combining unit 511. At this time, the respective decoders 513-1 to 513-$2N_R$ may operate as a single input single output (SISO) decoder. In other words, the respective decoders 513-1 to 513-$2N_R$ perform decoding without considering interference with other antennas.

The combination solving unit 515 performs a reverse conversion for a decoded result output from the decoders 513-1 to 513-$2N_R$ to correspond to a combination performed by the linear combining unit 515. That is, the combination solving unit 515 solves a combination of the bits, which has been made by the linear combining unit 511. Accordingly, it is possible to estimate the bits before encoding of the codewords generated in the transmitter 110. That is, the combination solving unit 515 outputs estimated bits of the bits before encoding of the codewords generated in the transmitter 110.

FIG. 5A is a structure for an IF decoding algorithm, which is a kind of IF reception algorithms. Another type of IF reception algorithm is IF detection. FIG. 5B illustrates the structure of a receiver 120 that supports IF detection. Referring to FIG. 5B, the receiver 120 includes a linear combining unit 521, an LLR calculator 523, an LLR converter 525, decoders 527-1 to 527-$2N_R$, and a combination solving unit 529. The linear combining unit 521 and the combination solving unit 529 may be referred to as a 'linear equalizer' and a 'linear equation solving unit', respectively.

The linear combining unit 521 multiplies the received signal for each antenna, which is received via the radio channel, by an equalization matrix. The operation of the linear combining unit 521 outputs signals representing linearly summed codewords and signals in which effective noises are summed. Accordingly, other codewords, which are generated by combining the codewords transmitted from the transmitter 110, are output. Unlike the linear combining unit 511 of FIG. 5A, the linear combining unit 521 may generate different integerized effective channel matrixes every time 't'. That is, the IF decoding algorithm uses one integerized effective channel matrix, while the IF detection algorithm uses a plurality of integerized effective channel matrixes. For example, if a channel matrix for the $t^{th}$ received-signal is $H_t$, $H_t$ is multiplied by $B_t$ through linear equalization (t=1, 2, . . . , and T). According to this, integerized effective channel matrixes $A_1$, $A_2$, . . . , and $A_T$ are generated. That is, the integerized effective channel matrix may vary depending on the time 't'.

The LLR calculator 523 calculates LLR values by using a given integerized effective channel matrix. That is, when $A_t$ is determined by the linear combining unit 521, the LLR calculator 523, by using $A_t$, calculates LLR values for the sum of symbols for each receiving antenna in the $t^{th}$ reception signal.

The LLR converter 525 converts the LLR values to conform to a new effective channel matrix. The new effective channel matrix is a new integer-valued matrix $\overline{A}$. The new integer-valued matrix $\overline{A}$ may be pre-defined. For example, the new integer-valued matrix $\overline{A}$ may be defined as an identity matrix. That is, the LLR converter 525 converts the LLR values corresponding to $A_t$ to the LLR values of the sum of the symbols by the new integer-valued matrix $\overline{A}$. Thereafter, the operation of the aforementioned IF decoding algorithm is applied to the converted LLR values.

The decoders 527-1 to 527-2$N_R$ perform decoding for the codewords by using the LLR values output from the LLR converter 525. At this time, the respective decoders 527-1 to 527-2$N_R$ may operate as an SISO decoder. In addition, the combination solving unit 529 performs a reverse conversion for a decoded result output from the decoders 527-1 to 527-2$N_R$ to correspond to a combination by the new integer-valued matrix $\overline{A}$. If the new integer-valued matrix $\overline{A}$ is an identity matrix, the decoding of each codeword may be performed without considering a codeword combination. In this case, the combination solving unit 529 may be omitted.

FIG. 5C illustrates an example of a structure of the receiver 120 for processing a received signal based on SLC in a wireless communication system according to various embodiments of the present disclosure. The terms '-unit', '-er(or)', or the like, which will be used below, denote a unit for processing at least one function or operation, and may be implemented by hardware, software, or a combination thereof.

Referring to FIG. 5C, the receiver 120 includes an equalizer 531, demodulators 532-1 through 532-M/2-1, first probability calculators 533-1 to 533-M/2-1, probability composers 534-2 to 534-M/2-2, second probability calculators 535-1 to 535-M/2-1, a decoder 536, and a recovery unit 537

The equalizer 531 performs IF equalization for the signal received from the transmitter 110. That is, the equalizer 531 multiplies the received signal for each antenna by an equalization matrix, thereby converting an effective channel matrix into an integer matrix. Accordingly, the equalizer 531 outputs summed symbols representing the linearly summed codewords (i.e., a summed symbol vector). Here, each of the summed symbols result from linear combination of the symbols, and may be referred to as a 'symbol combination'. The equalizer 531 may be an element corresponding to the linear combining unit 511 or the linear combining unit 521.

The demodulator 532-1 determines APP for the $1^{st}$ bit of each symbol combination in the symbol combination vector output from the equalizer 531. The first probability calculator 533-1 determines APP for the $1^{st}$ bit of the symbol by using the APP for the $1^{st}$ bit of the symbol combination. The second probability calculator 535-1 determines APP for the $1^{st}$ bit for determining APP for the $2^{nd}$ bit of the symbol by using the APP for the $1^{st}$ bit of the symbol.

The demodulator 532-2 determines APP for the $2^{nd}$ bit of the symbol combination by using the APP for the $1^{st}$ bit for determining APP for the $2^{nd}$ bit of the symbol, which is output from the second probability calculator 535-1. The first probability calculator 533-2 determines APP for the $2^{nd}$ bit of the symbol by using the APP for the $2^{nd}$ bit of the symbol combination. The probability composer 534-2 determines APP for the sum of the $1^{st}$ bit and the $2^{nd}$ bit of the symbol by using the APP for the $2^{nd}$ bit of the symbol output from the first probability calculator 533-2 and the APP for the $1^{st}$ bit of the symbol output from the first probability calculator 533-1. The second probability calculator 535-2 determines APP for the sum of the $1^{st}$ and $2^{nd}$ bits of the symbol combination by using the APP for the sum of the $1^{st}$ and $2^{nd}$ bits of the symbol output from the probability composer 534-2.

Operations similar to those of the demodulator 532-2, the first probability calculator 533-2, the probability composer 534-2, and the second probability calculator 535-2 are repeated by the demodulators 532-3 to 532-M/2-1, the first probability calculators 533-3 to 533-M/2-1, the probability composers 534-3 to 534-M/2-1, and the second probability calculator 535-3 to 535-M/2-1. Accordingly, the demodulator 532-M/2 determines APP for the M/2$^{th}$ bit of the symbol combination by using the APP for the $1^{st}$ to (M/2-1)$^{th}$ bits of the symbol combination output from the second probability calculator 535-M/2-1. The decoder 536 generates respective LLRs for the symbol combination by using the respective APPs output from the demodulators 532-1 to 532-M/2-1 and performs decoding using the LLRs. The recovery unit 537 recovers the information word by using a decoded result of the symbol combination output from the decoder 536. The recovery unit 537 may be an element corresponding to the combination solving unit 515 or the combination solving unit 529.

Figure 6:
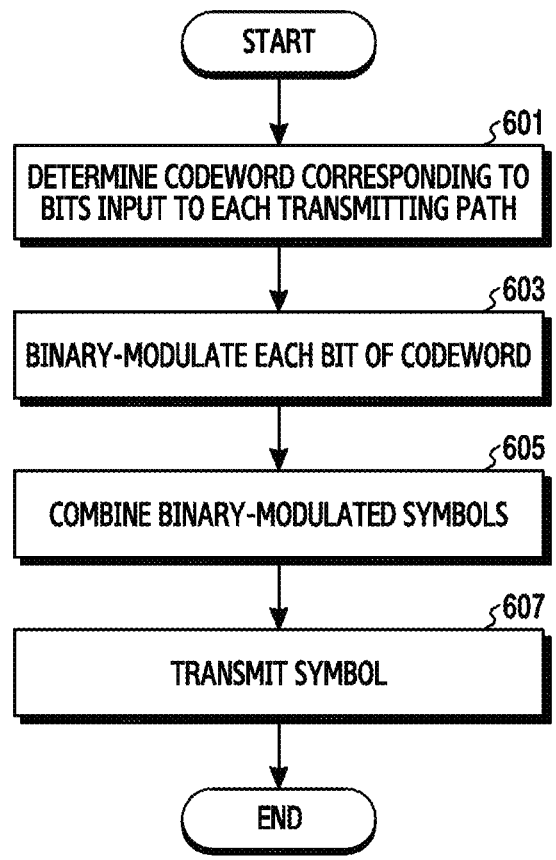
FIG. 6 illustrates an example of an operation method for transmitting, based on SLC, signals in a wireless communication system according to various embodiments of the present disclosure.

FIG. 6 illustrates an example of an operation method for transmitting, based on SLC, signals in a wireless communication system according to various embodiments of the present disclosure. FIG. 6 illustrates an operation method of the transmitter 110.

Referring to FIG. 6, in step 601, the transmitter 110 determines a codeword corresponding to bits input into the respective transmitting paths. That is, the transmitter 110 performs coding. The transmitter 110 maps one codeword with all of the input bits, instead of mapping a codeword for each bit level, in order to transmit, based on SLC, a signal. Here, the input bits may be referred to as an information word.

In step 603, the transmitter 110 performs binary modulation on the respective bits of the codeword. That is, the transmitter 110 divides the codeword into a plurality of bit streams and performs binary modulation on each bit stream. Accordingly, binary-modulated symbols are generated to correspond to each bit.

In step 605, the transmitter 110 combines the binary-modulated symbols. For example, the transmitter 110 generates a PAM symbol corresponding to at least a portion of the codeword by using the binary-modulated symbols. More specifically, the transmitter 110 scales the respective binary-modulated symbols so as to have sizes of $2^0, 2^1, 2^2, \ldots,$ and $2^{M/2-1}$, and then sums the same in order to thereby generate a $2^{M/2}$-PAM symbol. As a result, natural labeling may be applied to map bit values and constellation points such that the values indicated by the bits increase by 1 in the order of constellation points.

In step 607, the transmitter 110 transmits the generated symbol to the receiver 120. The PAM symbols may be generated for the respective transmitting antennas, and the transmitter 110 may transmit the PAM symbols through a plurality of transmitting antennas.

Figure 7:
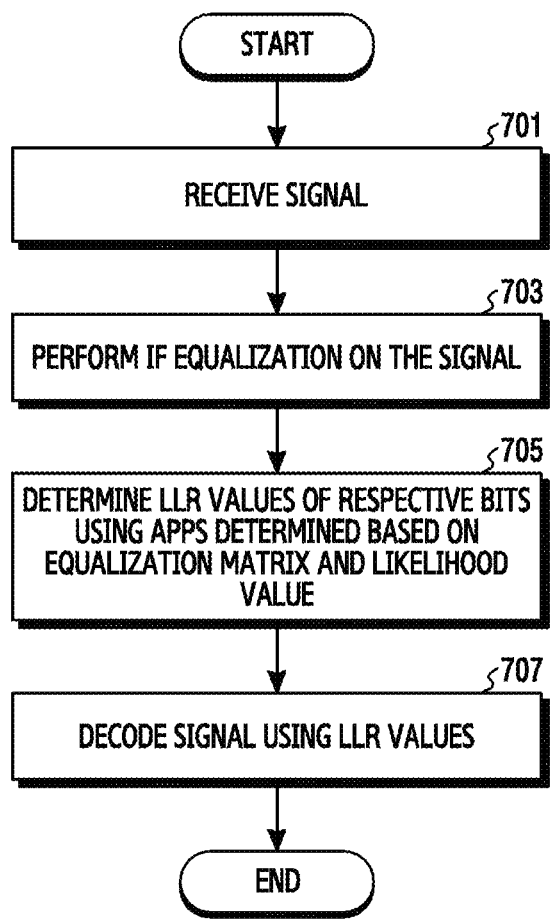
FIG. 7 illustrates an example of an operation method for processing a received signal based on SLC in a wireless communication system according to various embodiments of the present disclosure.

FIG. 7 illustrates an example of an operation method for processing a received signal based on SLC in a wireless communication system according to various embodiments of the present disclosure. FIG. 7 illustrates an operation method of the receiver 120.

Referring to FIG. 7, in step 701, the receiver 120 receives signals. That is, the receiver 120 receives signals, which are transmitted from a transmitter (e.g., the transmitter 110) through a plurality of transmitting antennas, using a plurality of receiving antennas. For example, the received signal may be expressed as Equation 4 below.

$$y = Hs + n \qquad \text{[Equation 4]}$$
$$= H\left(\sum_{m=1}^{M/2} 2^{m-1} x^{(m)}\right) + n$$

In Equation 4, y denotes a received-signal vector, H denotes a channel matrix, s denotes a transmission signal vector, n denotes a white Gaussian noise vector, and $x^{(m)}$ denotes a vector including the binary-modulated symbols generated by the $m^{th}$ bit allocated to the $2^{M/2}$-PAM symbol.

In step 703, the receiver 120 may perform IF equalization on the received signal. In other words, the receiver 120 multiplies the received signal for each receiving antenna by an equalization matrix, thereby converting the effective channel matrix into an integer matrix. As a result, a symbol combination vector, which represents linearly summed codewords, is generated. For example, the IF equalized signal may be expressed as Equation 5 below.

$$\tilde{y} = By \qquad \text{[Equation 5]}$$
$$= BHs + Bn$$
$$= As + (BH - A)s + Bn$$
$$= A\sum_{m=1}^{M/2} 2^{m-1} x^{(m)} + (BH - A)\sum_{m=1}^{M/2} 2^{m-1} x^{(m)} + Bn$$
$$= \sum_{m=1}^{M/2} 2^{m-1} z^{(m)} + w$$

In Equation 5, Y denotes an equalized received-signal vector, B denotes a real number matrix for allowing BH to be an integer matrix, 'y' denotes a received-signal vector, H denotes a channel matrix, 's' denotes a transmission signal vector, 'n' denotes a white Gaussian noise vector, 'A' denotes an integer matrix BH, $x^{(m)}$ denotes a vector including the binary-modulated symbols generated by the $m^{th}$ bit allocated to the $2^{M/2}$-PAM symbol, $z^{(m)} = Ax^{(m)}$ denotes a combination of binary-modulated symbol vectors having the $m^{th}$ smallest signal magnitude, and 'w' denotes an effective noise vector. In this case, the $n^{th}$ component $\tilde{y}_n$ of $\tilde{y}$ may be expressed as Equation 6 below.

$$\tilde{y}_n = \sum_{m=1}^{M/2} 2^{m-1} z_n^{(m)} + w_n \qquad \text{[Equation 6]}$$

In Equation 6, $\tilde{y}_n$ denotes the $n^{th}$ component of $\tilde{y}$, $z_n^{(m)}$ denotes the $n^{th}$ component of a combination of binary-modulated symbol vectors having the $m^{th}$ smallest signal magnitude, and $w_n$ denotes the $n^{th}$ component of an effective noise vector.

In step 705, the receiver 120 determines LLR values of the respective bits by using the APPs of the respective bits determined based on the equalization matrix and the likelihood value of the received signal. More specifically, the receiver 120 determines, based on the equalization matrix, APPs of the respective bits constituting the symbol combination and determines the LLR values by using the APPs. In order to determine the APP for one bit (e.g., the $m^{th}$ bit), the receiver 120 may use the APP for the lower bits {e.g., $1^{st}$ to $(m-1)^{th}$ bits}. Furthermore, in order to determine the APP for the lower bits, the receiver 120 may convert, based on the equalization matrix, the respective APPs for the lower bits of the symbol combination into the respective APPs for the symbol prior to the combination, and may then generate APP of the bits by summing the respective APPs in order to thereby determine, based on the equalization matrix, APP of the bits constituting the symbol combination.

In step 707, the receiver 120 decodes the signal by using the LLR values. Thereafter, according to the IF scheme, the receiver 120 may recover the information word from the decoded result by using an inverse matrix of the equalization matrix.

Figure 8:
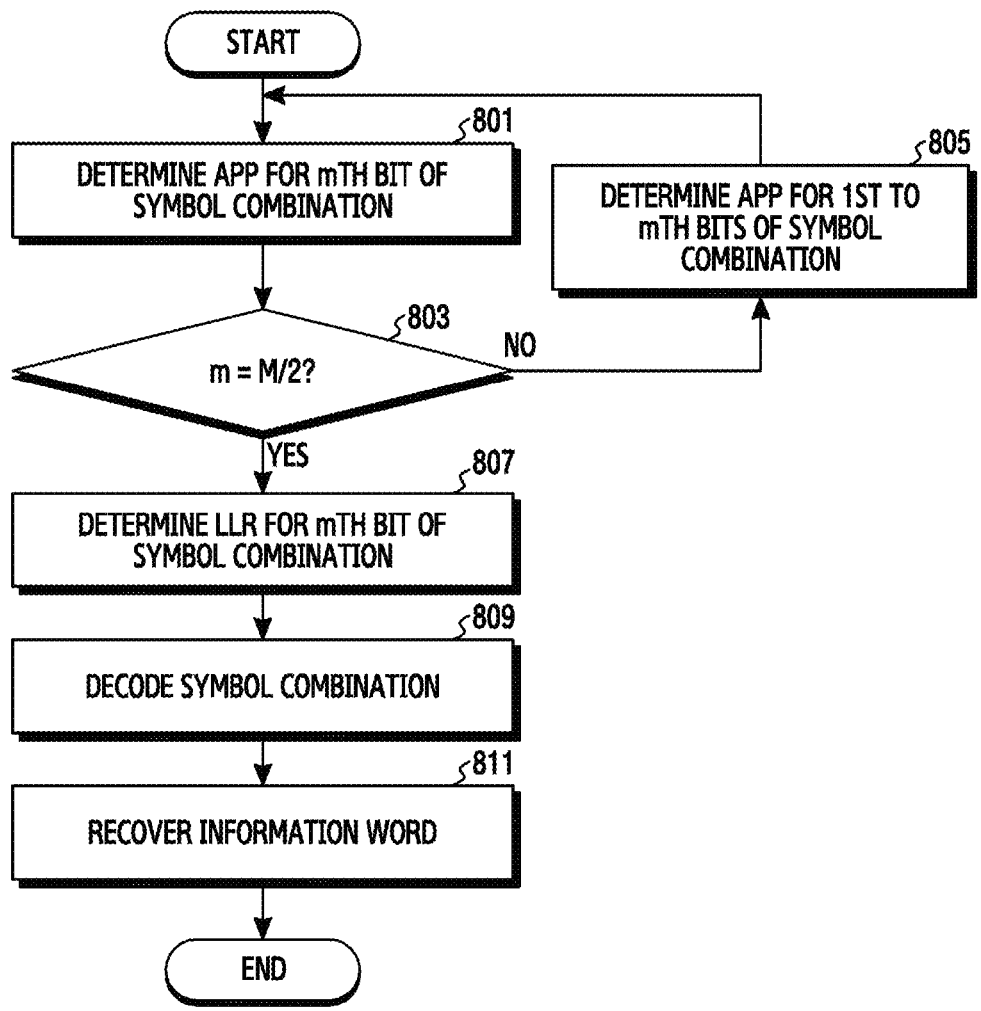
FIG. 8 illustrates an example of another operation method for processing a received signal based on SLC in a wireless communication system according to various embodiments of the present disclosure.

FIG. 8 illustrates an example of another operation method for processing a received signal based on SLC in a wireless communication system according to various embodiments of the present disclosure. FIG. 8 illustrates an operation method of the receiver 120.

Referring to FIG. 8, in step 801, the receiver 120 determines APP for the $m^{th}$ bit of a combination of symbols determined from the IF equalized signal. More specifically, the receiver 120 determines APP for the $m^{th}$ bit of the symbol combination from the APP for the $1^{st}$ to $(m-1)^{th}$ bits of the symbol combination.

In step 803, the receiver 120 checks whether or not the determined APP corresponds to the $M/2^{th}$ bit of the symbol combination. That is, the receiver 120 may check whether or not the APP for the $M/2^{th}$ bit of the symbol combination has been determined.

If the determined APP does not correspond to the $M/2^{th}$ bit of the symbol combination, the receiver 120 determines the APP for the sum of the $1^{st}$ to $m^{th}$ bits of the symbol combination in step 805. Thereafter, the receiver 120 proceeds to step 805 in order to thereby determine APP for the $(m+1)^{th}$ bit of the symbol combination from the APP for the sum of the $1^{st}$ to $m^{th}$ bits of the symbol combination.

On the other hand, if the determined APP corresponds to the $M/2^{th}$ bit of the symbol combination, the receiver 120 determines an LLR for the $m^{th}$ bit of the symbol combination in step 807. More specifically, the receiver 120 determines an LLR for the $m^{th}$ bit of the symbol combination from the APP for the $m^{th}$ bit of the symbol combination.

In step 809, the receiver 120 decodes the symbol combination. More specifically, the receiver 120 decodes the symbol combination corresponding to the $m^{th}$ bit by using the LLR for the $m^{th}$ bit of the symbol combination.

In step 811, the receiver 120 recovers the information word by using the symbol combination corresponding to the decoded $m^{th}$ bit. For example, the information word may be recovered by applying an inverse matrix $A^{-1}$ of the integer matrix A in Equation 5 to the symbol combination corresponding to the decoded $m^{th}$ bit. In some embodiments, the information word may be recovered by applying an inverse matrix of a new integer-valued matrix $\bar{A}$ to the symbol combination corresponding to the decoded $m^{th}$ bit.

Figure 9:
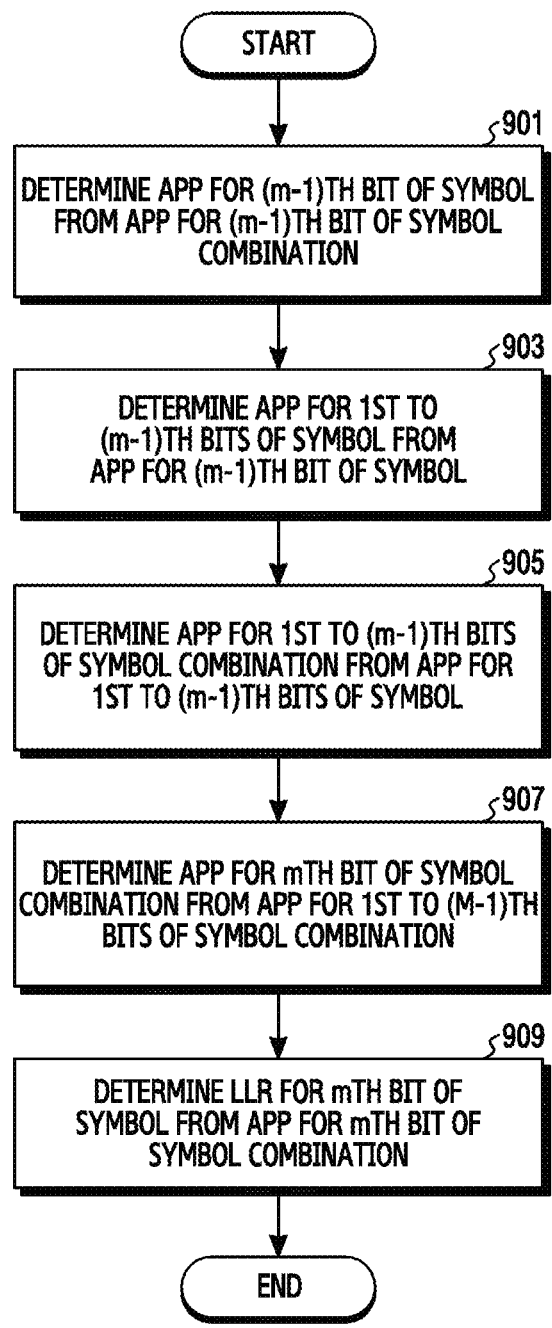
FIG. 9 illustrates an example of an operation method for determining a log likelihood ratio (LLR) for each bit of a received signal based on SLC in a wireless communication system according to various embodiments of the present disclosure.
Figure 10A:
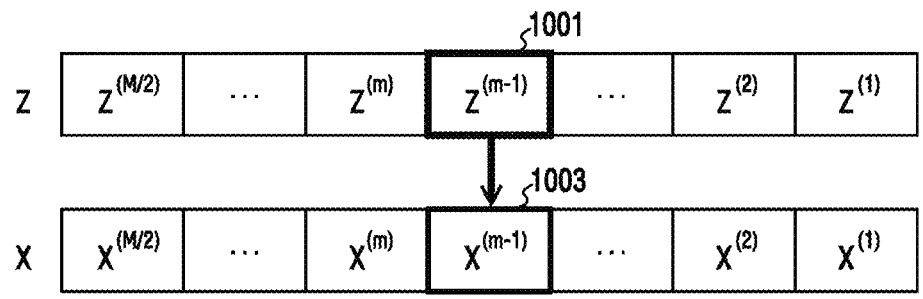
FIG. 10A illustrates an example of determining a posteriori probability (APP) for a binary-modulated symbol from APP for a combination of binary-modulated symbols in a wireless communication system according to various embodiments of the present disclosure.
Figure 10B:
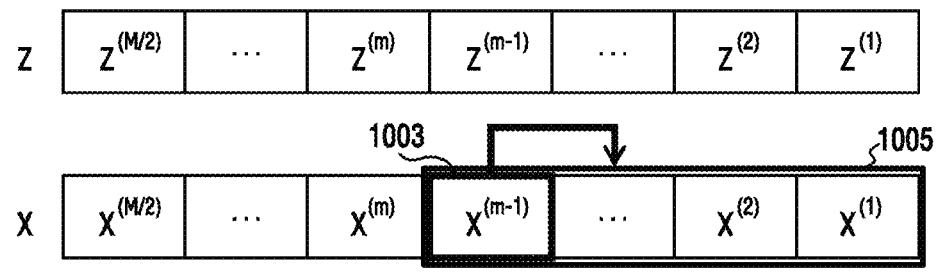
FIG. 10B illustrates an example of determining APP for the sum of binary-modulated symbols from APP for a binary-modulated symbol in a wireless communication system according to various embodiments of the present disclosure.
Figure 10C:
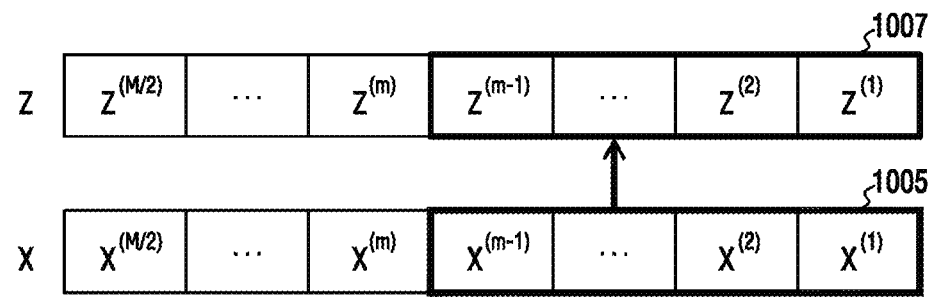
FIG. 10C illustrates an example of determining APP for the sum of a combination of binary-modulated symbols from APP for the sum of binary-modulated symbols in a wireless communication system according to various embodiments of the present disclosure.
Figure 10D:
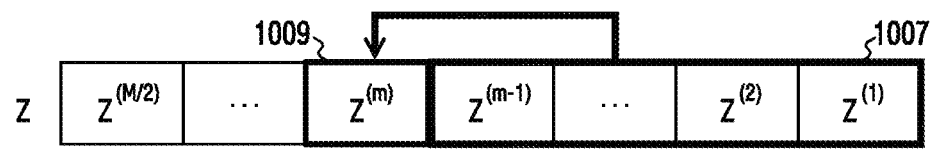
FIG. 10D illustrates an example of determining an LLR from APP for the sum of a combination of binary-modulated symbols in a wireless communication system according to various embodiments of the present disclosure.

FIG. 9 illustrates an example of an operation method for determining a log likelihood ratio (LLR) for each bit of a received signal based on SLC in a wireless communication system according to various embodiments of the present disclosure. FIG. 9 illustrates an operation method of the receiver 120.

Referring to FIG. 9, in step 901, the receiver 120 determines APP for the $(m-1)^{th}$ bit of the symbol from APP for the $(m-1)^{th}$ bit of the symbol combination. For example, referring to FIG. 10A, the APP for the $(m-1)^{th}$ bit $x^{(m-1)}$ 1003 of the symbol 'x' may be determined based on the APP for the $(m-1)^{th}$ bit $z^{(m-1)}$ 1001 of the symbol combination 'z'. In this case, the APP for the $(m-1)^{th}$ bit $x^{(m-1)}$ 1003 of the symbol 'x' may be expressed as Equation 7 below.

$$P(x_n^{(m-1)} = 0 \mid \tilde{y}) = \sum_{l^{(A^{-1})}_{n,l} \cdot c_l = 0 \bmod 2, c_l \in \{0,1\}} \prod_{n'=1}^{2N_T} P(z_{n'}^{(m-1)} = c_{n'} \bmod 2 \mid \tilde{y}_{n'}),$$

$$P(x_n^{(m-1)} = 1 \mid \tilde{y}) = \sum_{l^{(A^{-1})}_{n,l} \cdot c_l = 1 \bmod 2, c_l \in \{0,1\}} \prod_{n'=1}^{2N_T} P(z_{n'}^{(m-1)} = c_{n'} \bmod 2 \mid \tilde{y}_{n'}),$$

$$x^{(m-1)} = A^{-1} z^{(m-1)} \bmod 2$$

[Equation 7]

In Equation 7, $P(x_n^{(m-1)}=0|\tilde{y})$ and $P(x_n^{(m-1)}=1|\tilde{y})$ denote the APP for the $(m-1)^{th}$ bit $x^{(m-1)}$ of the symbol 'x', wherein $P(x_n^{(m-1)}=0|\tilde{y})$ denotes the probability that the $(m-1)^{th}$ bit $x^{(m-1)}$ of the symbol 'x' is 0 and $P(x_n^{(m-1)}=1|\tilde{y})$ denotes the probability that the $(m-1)^{th}$ bit $x^{(m-1)}$ of the symbol 'x' is 1. $P(x_{n'}^{(m-1)}=c_{n'} \bmod 2|\tilde{y})$ denotes the APP for the $(m-1)^{th}$ bit of the symbol combination 'z', and $A^{-1}$ denotes an inverse matrix of the integer matrix A in Equation 5.

In step 903, the receiver 120 determines the APP for the sum of the $1^{st}$ to $(m-1)^{th}$ bits of the symbol from the APP for the $(m-1)^{th}$ bit of the symbol. For example, referring to FIG. 10B, the APP for the sum 1005 of the $1^{st}$ to $(m-1)^{th}$ bits $x^{(1)}$, $x^{(2)}$, ..., and $x^{(m-1)}$ of the symbol 'x' may be determined based on the APP for the $(m-1)^{th}$ bit $x^{(m-1)}$ 1003 of the symbol 'x'. In this case, the APP for the sum 1005 of the $1^{st}$ to $(m-1)^{th}$ bits $x^{(1)}$, $x^{(2)}$, ..., and $x^{(m-1)}$ of the symbol 'x' may be given as Equation 8 below.

$$P\left(\sum_{p=1}^{m-1} 2^{p-1} x_n^{(p)} = i \mid \tilde{y}\right) = \prod_{p=1}^{m-1} P(x_n^{(p)} = i_p \mid \tilde{y}_p),$$

[Equation 8]

-continued $$i = 0, 1, \ldots, 2^m - 1$$

In Equation 8, $$P\left(\sum_{p=1}^{m-1} 2^{p-1} x_n^{(p)} = i \mid \tilde{y}\right)$$

denotes the APP for the sum of the $1^{st}$ to $(m-1)^{th}$ bits $x^{(1)}$, $x^{(2)}$, ..., and $x^{(m-1)}$ of the symbol 'x', and $P(x_n^{(p)}=i_p|\tilde{y}_p)$ denotes the APP for the $p^{th}$ bit $x^{(p)}$ of the symbol 'x'.

In step 905, the receiver 120 determines the APP for the sum of the $1^{st}$ to $(m-1)^{th}$ bits of the symbol combination from the APP for the sum of the $1^{st}$ to $(m-1)^{th}$ bits of the symbol. For example, referring to FIG. 10C, the APP for the sum 1007 of the $1^{st}$ to $(m-1)^{th}$ bits $z^{(1)}$, $z^{(2)}$, ..., and $z^{(m-1)}$ of the symbol combination 'z' may be determined based on the APP for the sum 1005 of the $1^{st}$ to $(m-1)^{th}$ bits $x^{(1)}$, $x^{(2)}$, ..., and $x^{(m-1)}$ of the symbol 'x'. In this case, the APP for the sum 1007 of the $1^{st}$ to $(m-1)^{th}$ bits $z^{(1)}$, $z^{(2)}$, ..., and $z^{(m-1)}$ of the symbol combination 'z' may be expressed as Equation 9 below.

$$P\left(\sum_{p=1}^{m-1} 2^{p-1} z_n^{(p)} = i \bmod 2^m \mid \tilde{y}\right) = \sum_{\sum_l (A)_{n,l} \cdot c_l = i \bmod 2^m, c_l \in \{0,1,\ldots,2^{m-1}-1\}} \prod_{n=1}^{2N_T} P\left(\sum_{p=1}^{m-1} 2^{p-1} x_n^{(p)} = c_p \mid \tilde{y}\right),$$

[Equation 9]

$$i = 0, 1, \ldots, 2^m - 1$$

$$\sum_{p=1}^{m-1} 2^{p-1} z^{(p)} = A\left(\sum_{p=1}^{m-1} 2^{p-1} x^{(p)}\right)$$

In Equation 9, $$P\left(\sum_{p=1}^{m-1} 2^{p-1} z_n^{(p)} = i \bmod 2^m \mid \tilde{y}\right)$$

denotes the APP for the $1^{st}$ to $(m-1)^{th}$ bits $z^{(1)}$, $z^{(2)}$, ..., and $z^{(m-1)}$ of the symbol combination 'z', $$P\left(\sum_{p=1}^{m-1} 2^{p-1} x_n^{(p)} = c_p \mid \tilde{y}\right)$$

denotes the APP for the $1^{st}$ to $(m-1)^{th}$ bits $x^{(1)}$, $x^{(2)}$, ..., and $x^{(m-1)}$ of the symbol 'x', and 'A' denotes an integer matrix BH of Equation 5.

In step 907, the receiver 120 determines the APP for the $m^{th}$ bit of the symbol combination from the APP for the $1^{st}$ to $(m-1)^{th}$ bits of the symbol combination. For example, referring to FIG. 10D, the APP for the $m^{th}$ bit $z^{(m)}$ 1009 of the symbol combination may be determined based on the APP for the $1^{st}$ to $(m-1)^{th}$ bits $z^{(1)}$, $z^{(2)}$, ..., and $z^{(m-1)}$ 1007 of the symbol combination 'z'. In this case, the APP for the $m^{th}$ bit $z^{(m)}$ 1009 of the symbol combination may be expressed as Equation 10 below.

$$P(z_n^{(m)} = 0 \bmod 2 \mid \tilde{y}) = \sum_{v=0}^{2^m-1} P\left(\sum_{p=1}^{m} 2^{p-1} \cdot z_n^{(p)} = \bar{y}_{n,v}^{(m)} \mid \tilde{y}_m\right) \times$$ [Equation 10]

$$P\left(\sum_{p=1}^{m-1} 2^{p-1} \cdot z_n^{(p)} = v \bmod 2^m \mid \tilde{y}\right)$$

$$P(z_n^{(m)} = 1 \bmod 2 \mid \tilde{y}) =$$

$$\sum_{v=0}^{2^m-1} P\left(\sum_{p=1}^{m} 2^{p-1} \cdot z_n^{(p)} = \bar{y}_{n,(v+2^{m-1})\bmod 2^m}^{(m)} \mid \tilde{y}_m\right) \times$$

$$P\left(\sum_{p=1}^{m-1} 2^{p-1} \cdot z_n^{(p)} = v \bmod 2^m \mid \tilde{y}\right)$$

In Equation 10, $P(z_n^{(m)}=0 \bmod 2|\tilde{y})$ and $P(z_n^{(m)}=1 \bmod 2|\tilde{y})$ denote the APP for the $m^{th}$ bit $z^{(m)}$ of the symbol combination 'z', wherein $P(z_n^{(m)}=0 \bmod 2|\tilde{y})$ denotes the probability that the $m^{th}$ bit $z^{(m)}$ of the symbol combination 'z' is zero and $P(z_n^{(m)}=1 \bmod 2|\tilde{y})$ denotes the probability that the $m^{th}$ bit $z^{(m)}$ of the symbol combination 'z' is 1.

$$P\left(\sum_{p=1}^{m-1} 2^{p-1} \cdot z_n^{(p)} = v \bmod 2^m \mid \tilde{y}\right)$$

denotes the APP for the $1^{st}$ to $(m-1)^{th}$ bits of the symbol combination, and $$\sum_{v=0}^{2^m-1} P\left(\sum_{p=1}^{m} 2^{p-1} \cdot z_n^{(p)} = \bar{y}_{n,v}^{(m)} \mid \tilde{y}_m\right)$$

denotes a likelihood function for the IF-equalized signal. For example, $$\sum_{v=0}^{2^m-1} P\left(\sum_{p=1}^{m} 2^{p-1} \cdot z_n^{(p)} = \bar{y}_{n,v}^{(m)} \mid \tilde{y}_m\right)$$

may be expressed as Equation 11 below.

$$P\left(\tilde{y}_n \mid \sum_{p=1}^{m} 2^{p-1} z_n^{(p)} = \bar{y}_{n,k}^{(m)}\right) \cong \frac{1}{\sqrt{2\pi\sigma_n^2}} \exp\left(-\frac{|\tilde{y}_n - \bar{y}_{n,k}^{(m)}|^2}{2\sigma_n^2}\right)$$ [Equation 11]

$$\bar{y}_{n,k}^{(m)} \triangleq 2^m \cdot \text{round}\left(\frac{\tilde{y}_n - k}{2^m}\right) + k, \ 1 \le n \le 2N_T,$$

$$0 \le k \le 2^m - 1, \ 1 \le m \le M/2$$

In Equation 11, $\bar{y}_{n,k}^{(m)}$ denotes an integer closest to $\tilde{y}_n$ under $k(0 \le k \le 2^m-1)$ and round $$\left(\frac{\tilde{y}_n - k}{2^m}\right)$$

denotes an integer closest to $$\frac{\tilde{y}_n - k}{2^m}$$

when modulo-$2^m$ ($1 \le m \le M/2$) is performed.

In step 909, the receiver 120 determines an LLR for the $m^{th}$ bit of the symbol combination from the APP for the $m^{th}$ bit of the symbol combination. The LLR may refer to the logarithm of a ratio of the probability that the $m^{th}$ bit of the symbol combination is 0 to the probability that the $m^{th}$ bit of the symbol combination is 1. For example, the LLR for the $m^{th}$ bit of the symbol combination may be expressed as Equation 12 below.

$$\mathcal{L}(z_n^{(m)} \mid \tilde{y}) := \log\frac{P(z_n^{(m)} = 0 \bmod 2 \mid \tilde{y})}{P(z_n^{(m)} = 1 \bmod 2 \mid \tilde{y})}$$ [Equation 12]

$$= \log\frac{P(2^{m-1} \cdot z_n^{(m)} = 2^{m-1} \cdot 0 \bmod 2^m \mid \tilde{y})}{P(2^{m-1} \cdot z_n^{(m)} = 2^{m-1} \cdot 1 \bmod 2^m \mid \tilde{y})}$$

$$= \log\frac{\displaystyle\sum_{v=0}^{2^m-1} P\left(2^{m-1} \cdot z_n^{(m)} = 2^{m-1} \cdot 0 \bmod 2^m \mid \tilde{y}, \sum_{p=1}^{m-1} 2^{p-1} \cdot z_n^{(p)} = v \bmod 2^m\right) \times P\left(\sum_{p=1}^{m-1} 2^{p-1} \cdot z_n^{(p)} = v \bmod 2^m \mid \tilde{y}\right)}{\displaystyle\sum_{v=0}^{2^m-1} P\left(2^{m-1} \cdot z_n^{(m)} = 2^{m-1} \cdot 1 \bmod 2^m \mid \tilde{y}, \sum_{p=1}^{m-1} 2^{p-1} \cdot z_n^{(p)} = v \bmod 2^m\right) \times P\left(\sum_{p=1}^{m-1} 2^{p-1} \cdot z_n^{(p)} = v \bmod 2^m \mid \tilde{y}\right)}$$

$$= \log\frac{\displaystyle\sum_{v=0}^{2^m-1} P\left(2^{m-1} \cdot z_n^{(m)} + \sum_{p=1}^{m-1} 2^{p-1} \cdot z_n^{(p)} = 2^{m-1} \cdot 0 + v \bmod 2^m \mid \tilde{y}, \sum_{p=1}^{m-1} 2^{p-1} \cdot z_n^{(p)} = v \bmod 2^m\right) \times P\left(\sum_{p=1}^{m-1} 2^{p-1} \cdot z_n^{(p)} = v \bmod 2^m \mid \tilde{y}\right)}{\displaystyle\sum_{v=0}^{2^m-1} P\left(2^{m-1} \cdot z_n^{(m)} + \sum_{p=1}^{m-1} 2^{p-1} \cdot z_n^{(p)} = 2^{m-1} \cdot 1 + v \bmod 2^m \mid \tilde{y}, \sum_{p=1}^{m-1} 2^{p-1} \cdot z_n^{(p)} = v \bmod 2^m\right) \times P\left(\sum_{p=1}^{m-1} 2^{p-1} \cdot z_n^{(p)} = v \bmod 2^m \mid \tilde{y}\right)}$$

-continued $$= \log \frac{\sum_{v=0}^{2^m-1} P\left(\sum_{p=1}^{m} 2^{p-1} \cdot z_n^{(p)} = \bar{y}_{n,v}^{(m)} \mid \tilde{y}_m\right) \times P\left(\sum_{p=1}^{m-1} 2^{p-1} \cdot z_n^{(p)} = v \bmod 2^m \mid \tilde{y}\right)}{\sum_{v=0}^{2^m-1} P\left(\sum_{p=1}^{m} 2^{p-1} \cdot z_n^{(p)} = \bar{y}_{n,(v+2^{m-1}) \bmod 2^m}^{(m)} \mid \tilde{y}_m\right) \times P\left(\sum_{p=1}^{m-1} 2^{p-1} \cdot z_n^{(p)} = v \bmod 2^m \mid \tilde{y}\right)}$$

In Equation 12, $L(z_o(m)|\tilde{y})$ denotes an LLR for the $m^{th}$ bit of the symbol combination. $P(z_n^{(m)}=0 \bmod 2|\tilde{y})$ and $P(z_n^{(m)}=1 \bmod 2|\tilde{y})$ denote the APP for the $m^{th}$ bit $z^{(m)}$ of the symbol combination 'z', wherein $P(z_n^{(m)}=0 \bmod 2|\tilde{y})$ denotes the probability that the $m^{th}$ bit $z^{(m)}$ of the symbol combination 'z' is zero and $P(z_n^{(m)}=1 \bmod 2|\tilde{y})$ denotes the probability that the $m^{th}$ bit $z^{(m)}$ of the symbol combination 'z' is 1.

$$P\left(\sum_{p=1}^{m-1} 2^{p-1} \cdot z_n^{(p)} = v \bmod 2^m \mid \tilde{y}\right)$$

denotes the APP for the $1^{st}$ to $(m-1)^{th}$ bits of the symbol combination, and $$\sum_{v=0}^{2^m-1} P\left(\sum_{p=1}^{m} 2^{p-1} \cdot z_n^{(p)} = \bar{y}_{n,v}^{(m)} \mid \tilde{y}_m\right)$$

denotes a likelihood function for the IF-equalized signal.

As another example, the LLR for the $1^{st}$ bit of the symbol combination may be expressed as Equation 13 below.

$$L(z_n^{(1)} \mid \tilde{y}_n) \triangleq \log \frac{P(z_n^{(1)} = 0 \bmod 2 \mid \tilde{y}_n)}{P(z_n^{(1)} = 1 \bmod 2 \mid \tilde{y}_n)}$$ [Equation 13]

$$= \log \frac{P(z_n^{(1)} = 0 \mid \tilde{y}_n) + P(z_n^{(1)} = 2 \mid \tilde{y}_n) + \ldots + P(z_n^{(1)} = -2 \mid \tilde{y}_n) + \ldots}{P(z_n^{(1)} = 1 \mid \tilde{y}_n) + P(z_n^{(1)} = 3 \mid \tilde{y}_n) + \ldots + P(z_n^{(1)} = -1 \mid \tilde{y}_n) + \ldots}$$

$$= \log \frac{P(z_n^{(1)} = \bar{y}_{n,0}^{(1)} \mid \tilde{y}_n)}{P(z_n = \bar{y}_{n,1}^{(1)} \mid \tilde{y}_n)}$$

$$= \log \frac{P(\tilde{y}_n \mid z_n^{(1)} = \bar{y}_{n,0}^{(1)})}{P(\tilde{y}_n \mid z_n^{(1)} = \bar{y}_{n,1}^{(1)})}$$

$$= -\frac{1}{2\sigma_n^2}(|\tilde{y}_n - \bar{y}_{n,0}^{(1)}|^2 - |\tilde{y}_n - \bar{y}_{n,1}^{(1)}|^2)$$

In Equation 13, $L(z_n^{(1)}|\tilde{y}_n)$ denotes an LLR for the $1^{st}$ bit of the symbol combination. $P(z_n^{(1)}=0 \bmod 2|\tilde{y}_n)$ and $P(z_n^{(1)}=1 \bmod 2|\tilde{y}_n)$ denote the APP for the $1^{st}$ bit $z^{(1)}$ of the symbol combination 'z', wherein $P(z_n^{(1)}=0 \bmod 2|\tilde{y}_n)$ denotes the probability that the $1^{st}$ bit $z^{(1)}$ of the symbol combination 'z' is zero and $P(z_n^{(1)}=1 \bmod 2|\tilde{y}_n)$ denotes the probability that the $1^{st}$ bit $z^{(1)}$ of the symbol combination 'z' is 1.

Figure 11:
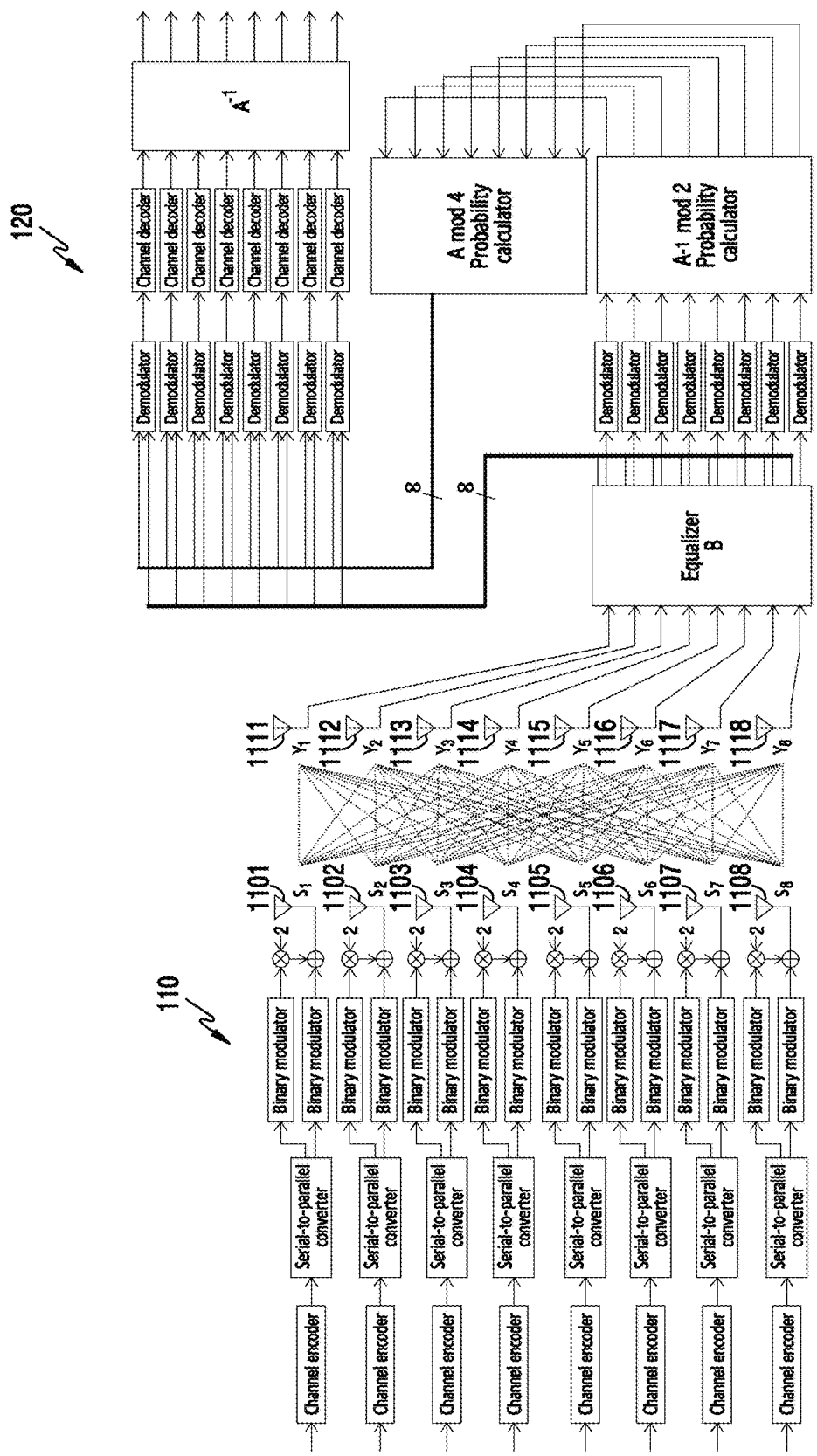
FIG. 11 illustrates an example of a transmitter and a receiver based on SLC in a wireless communication system according to various embodiments of the present disclosure.

FIG. 11 illustrates an example of the transmitter 110 and the receiver 120 based on SLC in a wireless communication system according to various embodiments of the present disclosure.

Referring to FIG. 11, the transmitter 110 includes eight transmitting antennas in a $2^4$-QAM-based IF-MIMO system. For example, the transmitter 110 may include transmitting antennas 1101, 1102, 1103, 1104, 1105, 1106, 1107, and 1108. The receiver 120 includes eight receiving antennas in a $2^4$-QAM-based IF-MIMO system. For example, the receiver 120 may include receiving antennas 1111, 1112, 1113, 1114, 1115, 1116, 1117, and 1118.

Figure 12:
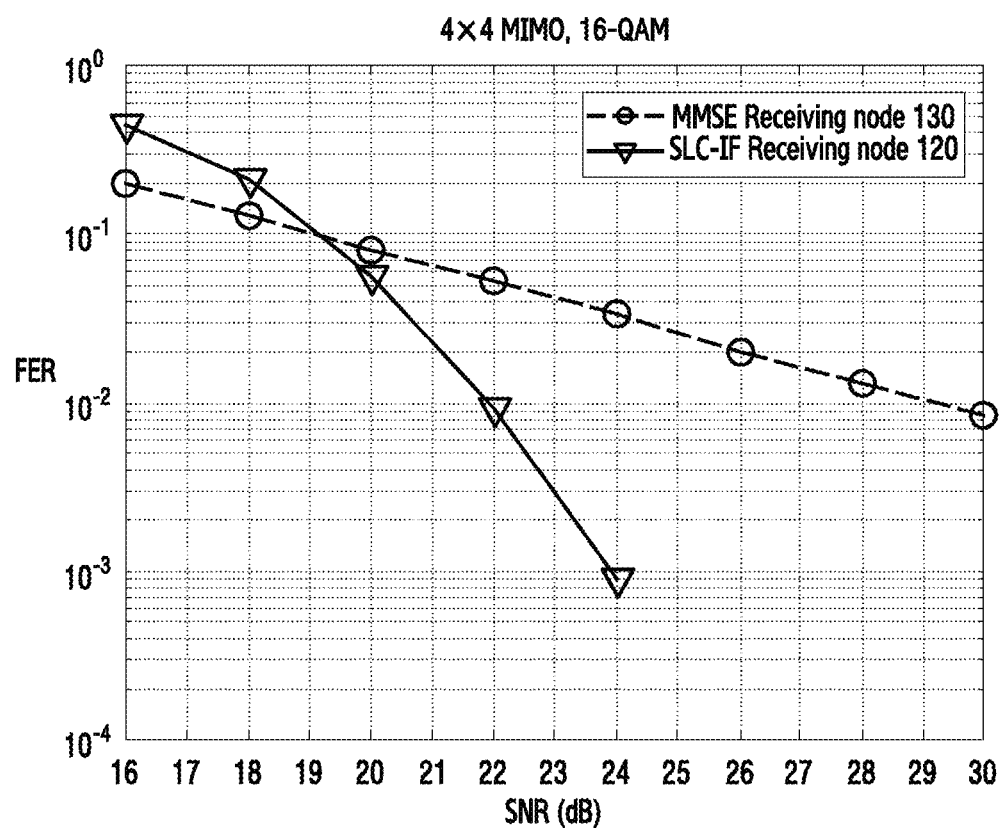
FIG. 12 illustrates an example of the frame error rate (FER) performance of a receiver in a wireless communication system according to various embodiments of the present disclosure.

Although FIG. 11 illustrates an example of the transmitter 110 and the receiver 120 in the $2^4$-QAM-based IF-MIMO system, the transmitter 110 and the receiver 120 are not limited thereto. FIG. 12 illustrates the frame error rate (FER) performance of the receiver 120 in the $2^4$-QAM-based IF-MIMO system.

FIG. 12 illustrates an example of the frame error rate (FER) performance of the receiver in a wireless communication system according to various embodiments of the present disclosure.

Referring to FIG. 12, the frame error rate (FER) performance of the receiver 120, which receives, based on SLC, signals in the IF-MIMO system, is superior to the FER performance of a receiver 130 that receives, based on a minimum mean square error (MMSE), signals in the wireless communication system. For example, if the FER is $10^{-2}$, the signal-to-noise ratio (SNR) of the signal received based on the SLC by the receiver 120 may be 22, while the SNR of the signal received by based on the MMSE the receiver 130 may be 30.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within an electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a device in a wireless communication system, the method comprising:
    applying an integer forcing (IF) equalization to a received signal to obtain an equalized signal;
    determining a log likelihood ratio (LLR) value of a bit in a symbol of the equalized signal based on a posteriori probability (APP) of other bits in the symbol of the equalized signal and a likelihood function for the equalized signal;
    obtaining the symbol of the equalized signal based on LLR values of a plurality of bits in the symbol of the equalized signal including the LLR value of the bit; and
    obtaining a symbol of the received signal from the symbol of the equalized signal.

2. The method of claim 1, wherein the determining of the LLR value of the bit comprises determining, based on an APP of a first bit in the symbol of the equalized signal, an APP of a first bit in the symbol of the received signal.

3. The method of claim 2, wherein the determining of the LLR value of the bit comprises determining, based on the APP of the first bit in the symbol of the received signal, an APP of other bits in the symbol of the received signal.

4. The method of claim 3, wherein the determining of the LLR value of the bit comprises determining, based on the APP of the other bits in the symbol of the received signal, the APP of the other bits in the symbol of the equalized signal.

5. The method of claim 1 wherein the determining of the LLR value of the bit comprises determining, based on the APP of the other bits in the symbol of the equalized signal, an APP of the bit in the symbol of the equalized signal.

6. The method of claim 5, wherein the determining of the LLR value of the bit comprises determining, based on the APP of the bit in the symbol of the equalized signal, the LLR value of the bit.

7. The method of claim 1, further comprising:
    obtaining a codeword for the plurality of bits,
    wherein symbols of the received signal comprising the symbol of the received signal are generated based on the plurality of bits, and
    wherein the codeword for the plurality of bits corresponds to an input to another device transmitting a signal corresponding to the received signal.

8. The method of claim 7, wherein the plurality of bits are applied with a natural labeling, in which bit values are mapped with constellation points such that values represented by the bits increase by 1 in an order of constellation points in a same domain.

9. The method of claim 1, wherein the symbol of the received signal is identified by applying an inverse of an integer matrix associated with an equalization matrix for the IF equalization to the symbol of the equalized signal.

10. A device in a wireless communication system, the device comprising:
    a transceiver; and
    at least one processor operatively coupled with the transceiver,
    wherein the at least one processor is configured to control to:
    apply an integer forcing (IF) equalization to a received signal to obtain an equalized signal,
    determine a log likelihood ratio (LLR) value of a bit in a symbol of the equalized signal based on a posteriori probability (APP) of other bits in the symbol of the equalized signal and a likelihood function for the equalized signal,
    obtain the symbol of the equalized signal based on LLR values of a plurality of bits in the symbol of the equalized signal including the LLR value of the bit, and
    obtain a symbol of the received signal from the symbol of the equalized signal.

11. The device of claim 10, wherein the at least one processor is configured to control to determine, based on an APP of a first bit in the symbol of the equalized signal, an APP of a first bit in the symbol of the received signal.

12. The device of claim 11, wherein the at least one processor is configured to control to determine, based on the APP of the first bit in the symbol of the received signal, an APP of other bits in the symbol of the received signal.

13. The device of claim 12, wherein the at least one processor is configured to control to determine, based on the APP of the other bits in the symbol of the received signal, the APP of the other bits in the symbol of the equalized signal.

14. The device of claim 10, wherein the at least one processor is configured to control to determine, based on the APP of the other bits in the symbol of the equalized signal, an APP of the bit in the symbol of the equalized signal.

15. The device of claim 14, wherein the at least one processor is configured to control to determine, based on the APP of the bit in the symbol of the equalized signal, the LLR value of the bit.

16. The device of claim 10, wherein the at least one processor is further configured to obtain a codeword for the plurality of bits,
    wherein symbols of the received signal comprising the symbol of the received signal are generated based on the plurality of bits, and
    wherein the codeword for the plurality of bits corresponds to an input to another device transmitting a signal corresponding to the received signal.

17. The device of claim 16, wherein the plurality of bits are applied with a natural labeling, in which bit values are mapped with constellation points such that values represented by the bits increase by 1 in an order of constellation points in a same domain.

18. The device of claim 10, wherein the symbol of the received signal is identified by applying an inverse of an integer matrix associated with an equalization matrix for the IF equalization to the symbol of the equalized signal.

* * * * *